(12) United States Patent
Nakayama

(10) Patent No.: US 9,678,590 B2
(45) Date of Patent: Jun. 13, 2017

(54) PORTABLE ELECTRONIC DEVICE

(75) Inventor: Shusuke Nakayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/129,519

(22) PCT Filed: Jun. 25, 2012

(86) PCT No.: PCT/JP2012/004097
§ 371 (c)(1),
(2), (4) Date: Dec. 26, 2013

(87) PCT Pub. No.: WO2013/001779
PCT Pub. Date: Jan. 3, 2013

(65) Prior Publication Data
US 2014/0145993 A1    May 29, 2014

(30) Foreign Application Priority Data
Jun. 27, 2011   (JP) ................................ 2011-142113

(51) Int. Cl.
*G06F 3/041*    (2006.01)
*G06F 3/023*    (2006.01)
(Continued)

(52) U.S. Cl.
CPC .......... *G06F 3/0414* (2013.01); *G06F 3/0233* (2013.01); *G06F 3/0237* (2013.01);
(Continued)

(58) Field of Classification Search
CPC .... G06F 3/0414; G06F 3/0236; G06F 3/0237; G06F 3/0233; G06F 3/04886; H04M 2250/22; H04M 1/72519; H04M 2250/70
(Continued)

(56) References Cited

U.S. PATENT DOCUMENTS 6,919,927 B1    7/2005  Hyodo
2006/0109252 A1    5/2006  Kolmyko-Zotov et al.
(Continued)

FOREIGN PATENT DOCUMENTS

JP    05-143226 A    6/1993
JP    11-355617 A    12/1999
(Continued)

OTHER PUBLICATIONS

An Office Action; "Notice of Reasons for Rejection," issued by the Japanese Patent Office on Jun. 24, 2014, which corresponds to Japanese Patent Application No. 2013-522424 and is related to U.S. Appl. No. 14/129,519; with English language concise explanation.
(Continued)

*Primary Examiner* — Andrew Sasinowski
*Assistant Examiner* — Chineyere Wills-Burns
(74) *Attorney, Agent, or Firm* — Studebaker & Brackett PC

(57) ABSTRACT

A display unit (13) displays objects. A contact detection unit (11) detects contact at positions corresponding to the objects displayed on the display unit (13). A pressure detection unit (12) detects pressure due to contact on the contact detection unit (11). A control unit (10) executes processing associated with an object displayed on the display unit (13) when the contact detection unit (11) detects contact at a position corresponding to the object and data based on the pressure detected by the pressure detection unit (12) satisfies a predetermined standard. The control unit (10) executes control so that the predetermined standard differs among display areas of the display unit (13) on which the objects are displayed.

7 Claims, 6 Drawing Sheets

(51) Int. Cl.
*G06F 3/0488* (2013.01)
*H04M 1/725* (2006.01)

(52) U.S. Cl.
CPC .... *G06F 3/04886* (2013.01); *H04M 1/72519* (2013.01); *H04M 2250/22* (2013.01); *H04M 2250/70* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 2010/0039393 | A1* | 2/2010 | Pratt | G06F 3/0236 345/173 |
| 2010/0103127 | A1* | 4/2010 | Park et al. | 345/173 |
| 2010/0114974 | A1* | 5/2010 | Jung | G06F 3/016 707/802 |
| 2010/0141606 | A1* | 6/2010 | Bae | G06F 3/016 345/174 |
| 2011/0181539 | A1* | 7/2011 | Aono | G06F 3/0414 345/173 |

FOREIGN PATENT DOCUMENTS

| | | |
|---|---|---|
| JP | 2006-146936 A | 6/2006 |
| JP | 2010-521022 A | 6/2010 |
| JP | 2010-152736 A | 7/2010 |
| JP | 2011-081679 A | 4/2011 |

OTHER PUBLICATIONS

International Search Report; PCT/JP2012/004097; Aug. 21, 2012.

* cited by examiner

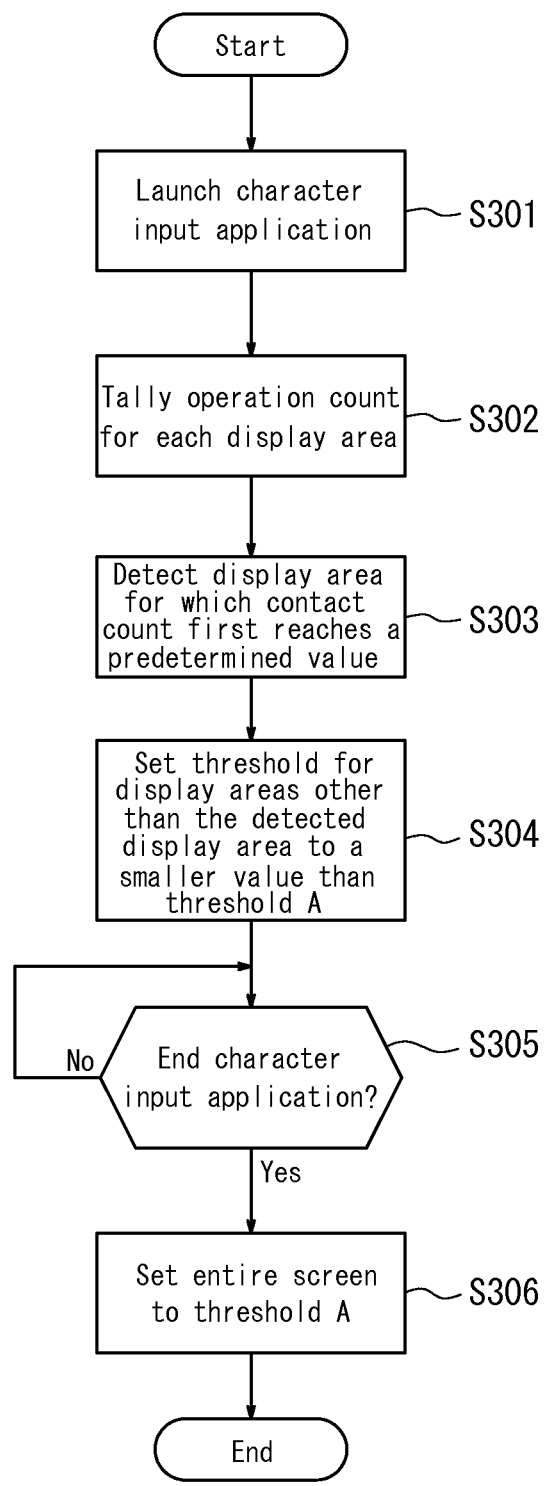

PORTABLE ELECTRONIC DEVICE

CROSS-REFERENCE TO RELATED APPLICATION

This application claims priority to and the benefit of Japanese Patent Application No. 2011-142113 filed Jun. 27, 2011, the entire contents of which are incorporated herein by reference.

TECHNICAL FIELD

The present invention relates to a portable electronic device that can detect contact by a user.

BACKGROUND

As an example of a known portable electronic device, it has been proposed to provide a digital camera with a touch panel on the upper face of a crystal monitor, the touch panel being capable of detecting a contact position and a pressure magnitude, and to provide different instructions to a camera operation system in accordance with the contact position on the touch panel and the magnitude of the pressure (for example, see Patent Literature 1). Furthermore, in recent years, a variety of mobile phones and smartphones having a display screen and a touch panel that cover nearly an entire surface of the device have been proposed.

CITATION LIST

Patent Literature 1: JP11355617A

SUMMARY

When detecting user operation with a touch panel, instructions can be provided in accordance with the magnitude of the pressure due to contact. In this case, for example, a setting such that an operation is not detected unless at least a certain pressure is applied can prevent an erroneous operation in which an operation is detected when the user simply contacted the touch panel by mistake. On the other hand, however, the user needs to apply at least a certain pressure to the touch panel for every operation. When applying pressure, therefore, the user needs to grip the portable electronic device more firmly than for a simple touch operation so as not to drop the device due to the pressure.

The portable electronic device, however, is usually of such a size that it protrudes from a user's grip when gripped by hand. Therefore, for a portable electronic device having a display screen and a touch panel that cover nearly an entire surface of the device, pressing an area corresponding to the location at which the user is gripping the device presents no problem in particular, yet upon pressing an area corresponding to a location at which the user is not gripping the device, the pressure may cause the device to move. As a result, it may not be possible to apply pressure appropriately, and an operation might not be detected, or the user might end up dropping the device.

The present invention has been conceived in light of the above considerations and provides a portable electronic device that can reliably detect user operation while effectively preventing the device from being dropped at the time of operation.

A portable electronic device according to a first aspect of the present invention for achieving the above object includes: a display unit configured to display a plurality of objects; a contact detection unit configured to detect contact at a plurality of positions corresponding to the objects displayed on the display unit; a pressure detection unit configured to detect pressure due to contact on the contact detection unit; and a control unit configured to execute processing associated with an object displayed on the display unit when the contact detection unit detects contact at a position corresponding to the object and data based on the pressure detected by the pressure detection unit satisfies a predetermined standard, with the control unit executing control so that the predetermined standard differs among a plurality of display areas of the display unit on which the objects are displayed.

A portable electronic device according to a second aspect of the present invention is the portable electronic device according to the first aspect, with the control unit executing control so that when a contact count of a number of times the contact detection unit detects contact to an object in a same display area of the display unit satisfies a predetermined value, the predetermined standard for display areas other than the same display area is lower than the predetermined standard for the same display area.

A portable electronic device according to a third aspect of the present invention is the portable electronic device according to the first aspect, with the control unit executing control so that the predetermined standard for a display area at an upper portion of a screen of the display unit is lower than the predetermined standard for other display areas.

A portable electronic device according to a fourth aspect of the present invention is the portable electronic device according to the first aspect, with the control unit executing control so that the predetermined standard differs among the display areas in accordance with an application displaying the objects on the display unit.

A portable electronic device according to a fifth aspect of the present invention is the portable electronic device according to the second aspect, with the control unit executing control so that, in accordance with a distance from a display area for which the contact count satisfies the predetermined value, the predetermined standard for display areas other than the display area is incrementally lowered.

A portable electronic device according to a sixth aspect of the present invention is the portable electronic device according to the third aspect, with the control unit executing control so that the predetermined standard is incrementally lowered from a display area at a lower portion of the screen of the display unit towards a display area at the upper portion of the screen.

The portable electronic device according to the present invention can reliably detect user operation while effectively preventing the device from being dropped at the time of operation.

BRIEF DESCRIPTION OF DRAWINGS

The present invention will be further described below with reference to the accompanying drawings, wherein:

FIG. 6 is a flowchart illustrating an example of operations by a portable electronic device according to Embodiment 3 of the present invention.

DESCRIPTION OF EMBODIMENTS

The following describes embodiments of the present invention with reference to the drawings. In the following embodiments, a predetermined standard for data based on pressure is, for the sake of convenience, described as a threshold for detecting user operation.

Embodiment 1

Figure 1:
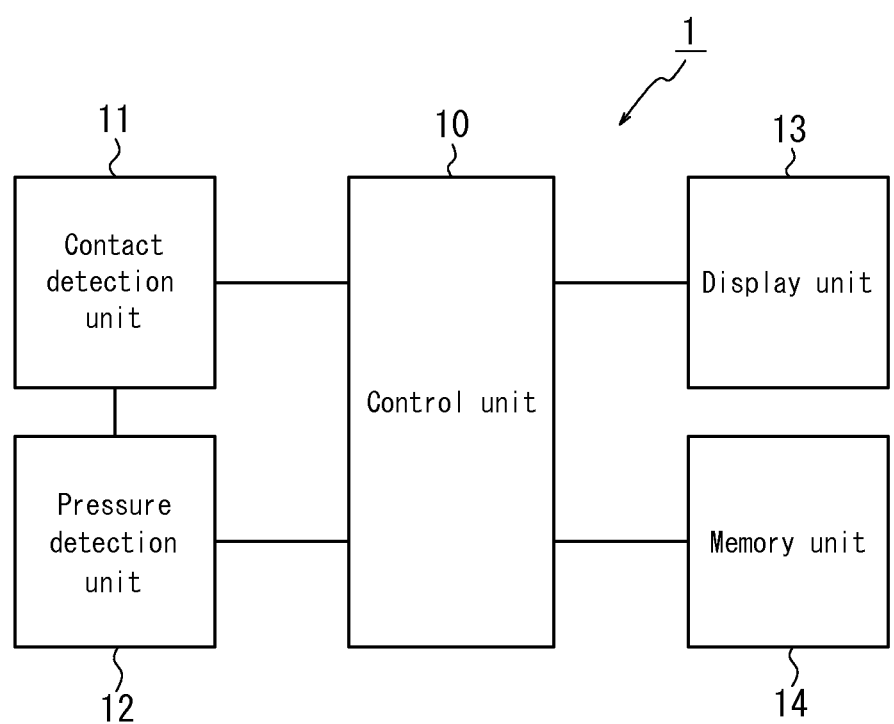
FIG. 1 is a functional block diagram illustrating the main structure of a portable electronic device according to Embodiment 1 of the present invention.

FIG. 1 is a functional block diagram illustrating the main structure of a portable electronic device according to Embodiment 1 of the present invention. A portable electronic device 1 illustrated in FIG. 1 is provided with a control unit 10, a contact detection unit 11, a pressure detection unit 12, a display unit 13, and a memory unit 14.

The contact detection unit 11 is, for example, provided with a touch panel positioned on the display screen of the display unit 13 and detects contact at positions corresponding to objects displayed on the display unit 13. Information on the contact position detected by the contact detection unit 11 is output to the control unit 10. A known type of touch panel, such as a resistive film type, a capacitive type, an optical type, or the like may be used.

The pressure detection unit 12 detects pressure on the contact detection unit 11 at the time of user operation and is, for example, configured using a strain gauge sensor, an element such as a piezoelectric element, or the like that experiences a change in physical or electrical characteristics (strain, resistance, voltage, or the like) in response to pressure. When the pressure detection unit 12 is configured using a piezoelectric element or the like, for example, the magnitude of the voltage (voltage value (referred to below as data based on pressure)), which is an electrical characteristic, of the piezoelectric element changes in accordance with the magnitude of the load (force) of the pressure on the contact detection unit 11 (or the speed at which the magnitude of the load (force) changes (acceleration)). When the data based on pressure is equal to or greater than a predetermined threshold, the control unit 10 can execute control for predetermined processing based, for example, on an application.

The control unit 10 acquires the data based on pressure by the pressure detection unit 12 notifying the control unit 10 of the data based on pressure, or by the control unit 10 detecting the data based on pressure of the pressure detection unit 12. The control unit 10 thus acquires data based on pressure on the contact detection unit 11 from the pressure detection unit 12. Note that instead of a voltage value, the data based on pressure may, for example, be power, resistance, or magnitude of the load related to the pressure.

Furthermore, the pressure detection unit 12 can be configured in accordance with the contact detection type of the touch panel of the contact detection unit 11. For example, if the touch panel is a resistive film type, a configuration without a strain gauge sensor, piezoelectric element, or the like may be adopted by associating the magnitude of the resistance that corresponds to the size of the contact area with the load (force) of the pressure on the touch face of the touch panel. Alternatively, if the touch panel is a capacitive type, a configuration without a strain gauge sensor, a piezoelectric element, or the like may be adopted by associating the magnitude of the capacitance with the load (force) of the pressure on the touch panel.

The pressure detection unit 12 may measure the change in the gap between the touch panel and the display unit 13 occurring when the touch panel is pressed. In this case, the data based on pressure corresponds to the value of the change in the gap. Alternatively, the pressure detection unit 12 may measure the change in the gap between the touch panel and other components, such as a circuit board.

The display unit 13 displays a plurality of objects in accordance with the application that is being executed and displays characters in accordance with user operation.

The memory unit 14 is a representation as a single memory unit, for the sake of convenience, of the memories necessary for operations by the portable electronic device 1, such as a memory storing thresholds for setting a predetermined standard for detecting user operation by data based on pressure detected by the pressure detection unit 12, a working memory for the control unit 10, a program storage memory, and the like. Each threshold set for a display area of an object in the display unit 13 is stored in the memory unit 14.

The control unit 10 controls overall operations of the portable electronic device 1. The control unit 10 executes processing in accordance with input information from the contact detection unit 11 and data based on pressure as input from the pressure detection unit 12, displaying the result on the display unit 13.

Figure 2:
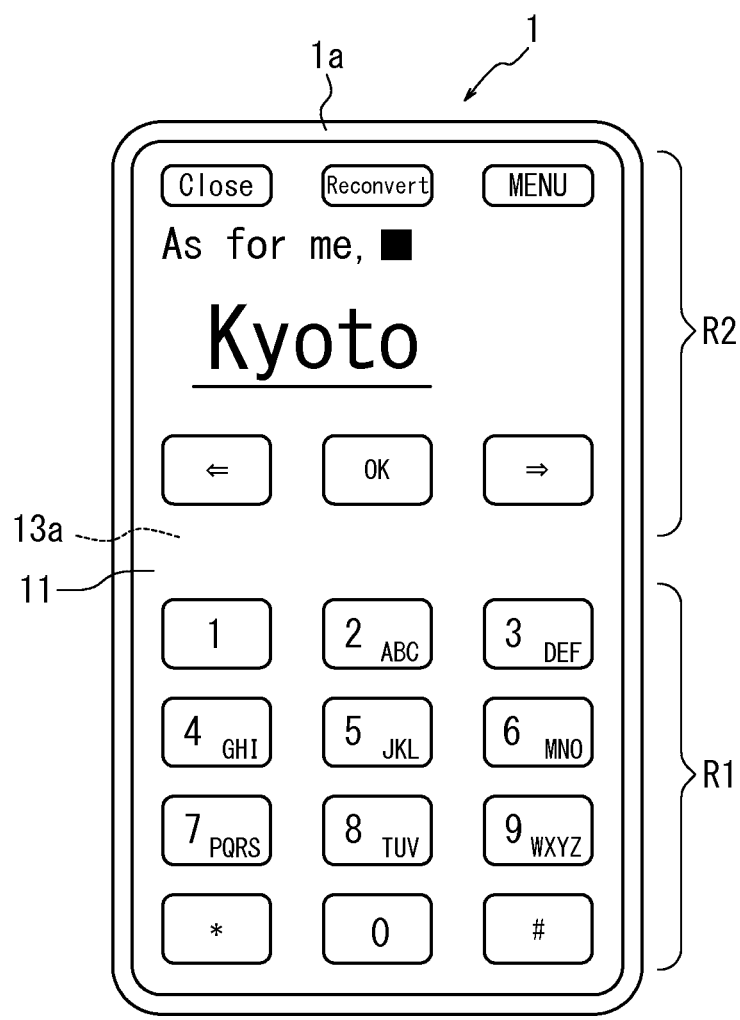
FIG. 2 is a plan view illustrating an example of the portable electronic device in FIG. 1.

FIG. 2 is a plan view illustrating an example of the portable electronic device 1 in which the functional block illustrated in FIG. 1 is stored internally. The surface outline of the portable electronic device 1 is rectangular, and except for an outer frame 1a of the surface, nearly the entire surface forms a screen 13a of the display unit 13 in FIG. 1. The contact detection unit 11, which is transparent and formed from a touch panel, is positioned on the screen 13a.

In this portable electronic device 1, when a character input application such as a notepad, an e-mail input screen, or the like is launched, a plurality of objects, for example such as those illustrated in FIG. 2, are displayed on the screen 13a. FIG. 2 illustrates an example in which numerical key objects for a character input operation are displayed in a display area R1 at the lower half of the screen 13a, and a screen displaying the result of a character input operation, as well as objects such as keys for launching other applications not directly related to a character input operation, are displayed in a display area R2 at the upper half of the screen 13a. Instead of numerical keys, QWERTY keys or the like may be displayed in the lower half of the screen 13a.

In other words, in a character input application, if the numerical keys that are frequently used for a character input operation are displayed in the display area R2 at the upper side of the screen 13a, the screen 13a will be hidden by the user's hand during the character input operation, making the character input operation difficult to perform. Therefore, the frequently operated numerical keys are displayed in the display area R1 at the bottom side of the screen 13a, and objects used less frequently than the numerical keys such as movement keys, a selection key, and the like, as well as objects for the result of character input and for launching another application, are displayed in the display area R2 at the upper side of the screen 13a.

In this case, the user generally grips the portable electronic device 1 so that the center of the grip is located in the lower half of the portable electronic device 1, where the frequently operated numerical keys are displayed. Therefore, pressing the numerical keys displayed in the display area R1 corresponding to the portion that the user grips presents no problem in particular. Pressing an object displayed in the display area R2 in the upper half of the screen 13a corresponding to the portion that the user is not gripping, however, may cause the portable electronic device 1 to move due to pressure. As a result, if a predetermined standard for detecting a press operation by the user is set to be uniform across all regions of the screen 13a, the portable electronic device 1 may become unstable, preventing pressure from being applied appropriately. An operation might not be detected, or the user might end up dropping the portable electronic device 1.

As a countermeasure, in the portable electronic device 1 of the present embodiment, two thresholds, A and B (A>B) are stored as predetermined standards in the memory unit 14. The threshold A is a standard threshold that is set in advance for all objects displayed on the screen 13a. As illustrated in FIG. 2, upon the launching of a character input application, for which objects for detecting user operation by contact are displayed in the display area R1 at the upper half and in the display area R2 at the lower half of the screen 13a, the control unit 10 leaves the threshold for the lower half of the screen 13a unchanged at the standard threshold A yet changes the threshold setting for the upper half of the screen 13a to the threshold B, which is smaller than the standard threshold A. In other words, the control unit 10 sets different thresholds among display areas of objects in accordance with the application that displays a plurality of objects on the display unit 13.

Figure 3:
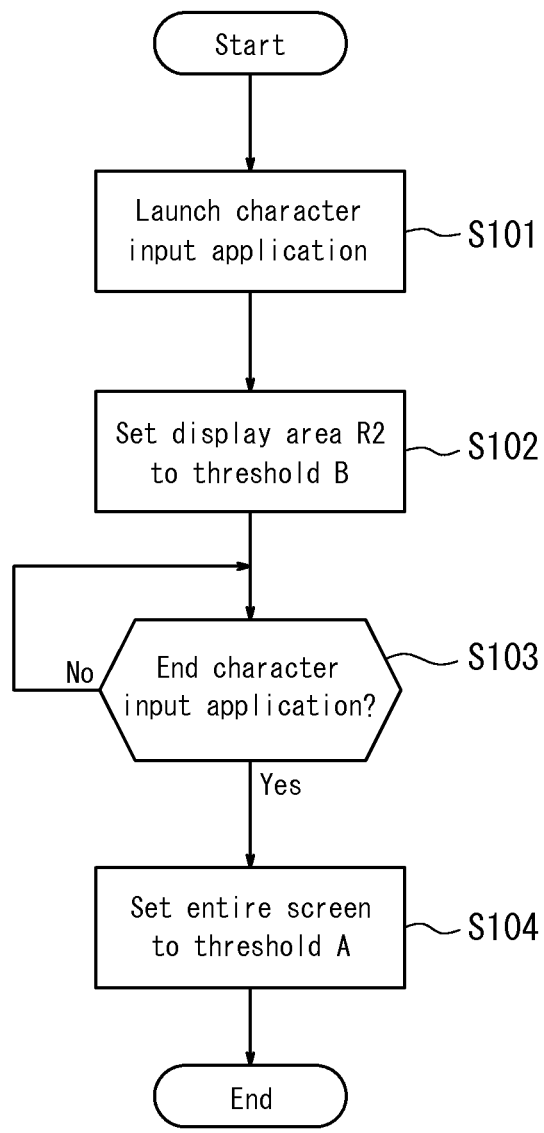
FIG. 3 is a flowchart illustrating operations of Embodiment 1.

FIG. 3 is a flowchart illustrating operations for the present case. First, the control unit 10 launches a character input application based on user operation (step S101) and changes the threshold setting for the display area R2 at the upper half of the screen 13a from the standard threshold A to the threshold B (step S102). In this state, when contact is detected at a position corresponding to an object, such as a numerical key, displayed in the display area R1 at the lower half of the screen 13a, and data based on pressure detected by the pressure detection unit 11 satisfies the threshold A, the control unit 10 executes processing associated with the object. Similarly, when contact is detected at a position corresponding to an object displayed in the display area R2 at the upper half of the screen 13a, and data based on pressure detected by the pressure detection unit 11 satisfies the threshold B, the control unit 10 executes processing associated with the object.

When determining in step S103 that an operation to end the character input application has been performed, the control unit 10 changes the threshold setting for the display area R2 at the upper half of the screen 13a from the threshold B to the standard threshold A, i.e. returns the threshold to its original value (step S104) and ends the character input application.

In this way, according to the present embodiment, the threshold for the display area R2 at the upper half of the screen of the display unit 13 is set to be smaller than the threshold for the display area R1 at the lower half of the screen (standard threshold) in accordance with the application. As described above, the portion of the portable electronic device 1 corresponding to the display area R1 at the lower side of the screen normally tends to be gripped by the user. Therefore, when objects for frequently operated numerical keys or the like are displayed in the display area R1 at the lower side of the screen and non-frequently operated objects are displayed in the display area R2 at the upper half, as in the above-described character input application, an input operation by pressure can be reliably detected while effectively preventing the portable electronic device 1 from being dropped at the time of an input operation.

Embodiment 2

In Embodiment 2 of the present invention, when there are three or more display areas of objects in the vertical direction of the screen for the application that is being executed in the portable electronic device 1 having the functional block illustrated in FIG. 1, the threshold is incrementally set smaller from a display area at a lower portion of the screen towards a display area at an upper portion of the screen. Therefore, three or more thresholds that can be set for the device 1 are stored in the memory unit 14 of FIG. 1. For the sake of convenience, it is assumed here is that three thresholds are stored: a standard threshold A, a threshold B, and a threshold C (A>B>C). With reference to FIG. 1, operations of the portable electronic device 1 of the present embodiment are described.

In the present embodiment, the upper portion of the screen and the lower portion of the screen are, for example, defined as follows: when the user grips the portable electronic device 1 roughly horizontally in order to operate the portable electronic device 1 in a normal state, the portion of the screen closer to the user is the lower portion of the screen, and the portion of the screen further away from the user is the upper portion of the screen. When the upper portion of the screen and the lower portion of the screen are not fixed with respect to the display unit of the portable electronic device 1, and the display state of the screen rotates or the like based on an acceleration sensor or the like, then based on the display state of the screen, the upper and lower portions of the screen can be changed as necessary.

Figure 4:
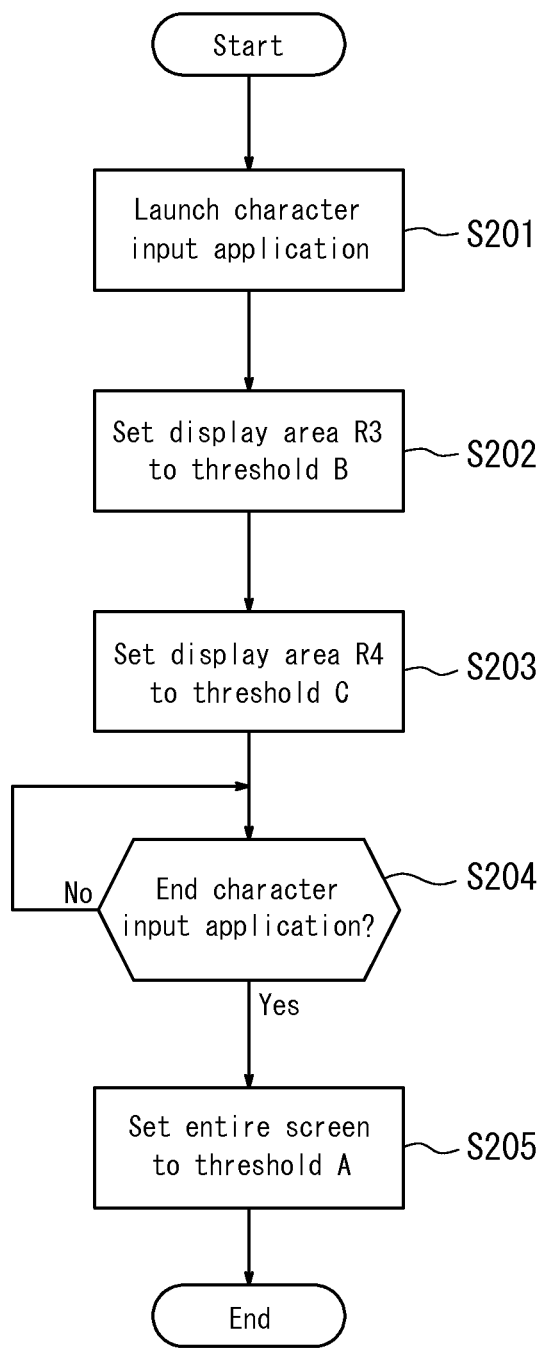
FIG. 4 is a flowchart illustrating an example of operations by a portable electronic device according to Embodiment 2 of the present invention.
Figure 5:
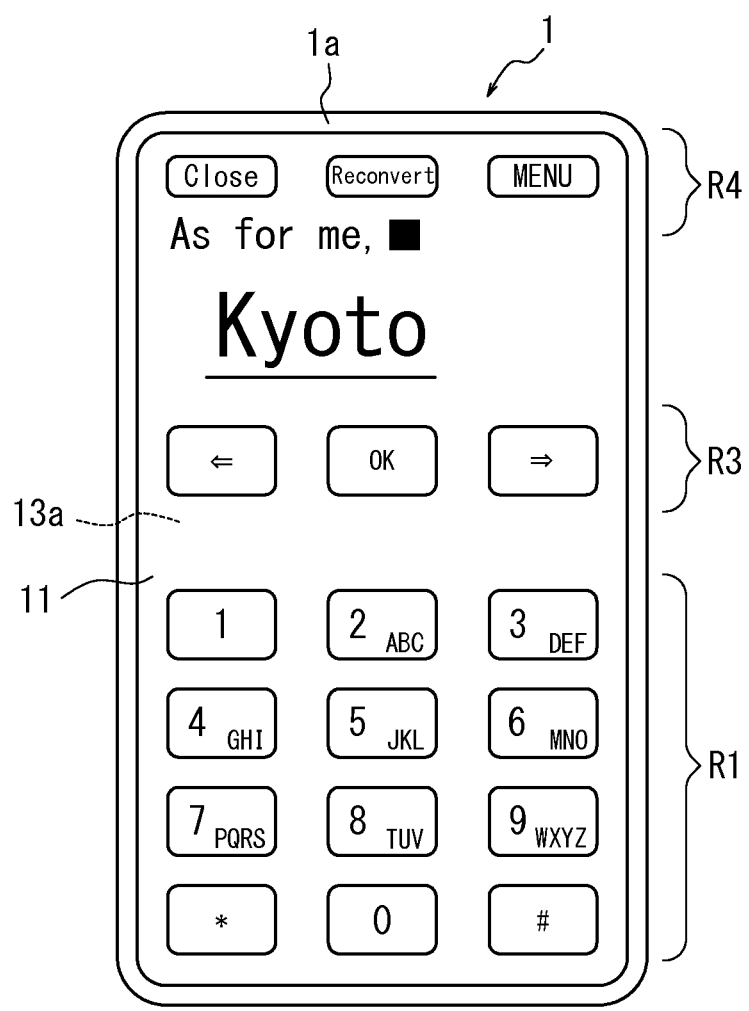
FIG. 5 is an example of display areas of objects in order to illustrate operations of Embodiment 2.

FIG. 4 is a flowchart illustrating an example of operations of the present embodiment. First, the control unit 10 launches a character input application based, for example, on user operation (step S201). When the launched character input application displays a plurality of objects on the screen 13a of the display unit 13, as illustrated in FIG. 5, then the control unit 10 divides the display area of the objects into a display area R1 at the lower half of the screen 13a, a display area R3 extending ¼ of the way up from the center of the screen 13a, and a display area R4 extending ¼ of the way down from the top of the screen 13a.

Next, the control unit 10 changes the threshold setting for the display area R3 to the threshold B (step S202) and changes the threshold setting for the display area R4 to the threshold C (step S203). The threshold for the display area R1 in which objects for numerical keys or the like are displayed is left unchanged at the standard threshold A.

Subsequently, when contact is detected at a position corresponding to an object, such as a numerical key, displayed in the display area R1 of the screen 13a, and data based on pressure detected by the pressure detection unit 11 satisfies the threshold A, the control unit 10 executes processing associated with the object. When contact is detected at a position corresponding to an object displayed in the display area R3 of the screen 13a, and data based on pressure detected by the pressure detection unit 11 satisfies the threshold B, the control unit 10 executes processing associated with the object. Similarly, when contact is detected at a position corresponding to an object displayed in the display area R4 of the screen 13a, and data based on pressure detected by the pressure detection unit 11 satisfies the threshold C, the control unit 10 executes processing associated with the object.

When determining in step S204 that an operation to end the character input application has been performed, the control unit 10 returns the threshold for the display areas R3 and R4 of all of the objects at the upper half of the screen 13*a* to the standard threshold A (step S205) and ends the character input application.

In this way, according to the present embodiment, the threshold for the display areas of objects on the screen 13*a* of the display unit 13 is incrementally set smaller from the display area at the lower portion of the screen towards the display area at the upper portion of the screen. Therefore, as an object is displayed further up the screen, an input operation is detected at a smaller threshold, so that an input operation by pressure can be performed more reliably while more effectively preventing the portable electronic device 1 from being dropped at the time of an input operation.

Embodiment 3

In Embodiment 3 of the present invention, the threshold for all of the display areas in the portable electronic device 1 having the functional block illustrated in FIG. 1 is set to the standard threshold A until a contact count of the number of times an object in the same display area in the display unit 13 is contacted exceeds a predetermined value. When the contact count exceeds the predetermined value, the threshold for the display areas other than the same display area is set to a smaller value than the standard threshold A. The contact count includes the meaning of an execution count of the number of times that processing associated with a contacted object is executed. With reference to FIG. 1, operations of the portable electronic device 1 of the present embodiment are described.

FIG. 6 is a flowchart illustrating an example of operations of the present embodiment. First, the control unit 10 launches a character input application based, for example, on user operation (step S301). When contact is detected at a position corresponding to an object displayed on the display unit 13 while the threshold for the display areas of all of the objects on the display unit 13 is being maintained at the standard threshold A, and data based on pressure detected by the pressure detection unit 11 satisfies the threshold A, the control unit 10 executes processing associated with the object.

Upon launching the character input application, the control unit 10 tallies the contact count for objects in each display area of objects in the vertical direction of the screen of the display unit 13, i.e. the execution count for processing associated with the objects (step S302). Upon detecting the display area for which the contact count first reaches the predetermined value (step S303), the control unit 10 sets the threshold for the display areas other than the detected display area to a smaller value than the standard threshold A (step S304). Note that the predetermined value of the contact count for objects may be set to any of two or more arbitrary values in accordance with the application.

When the plurality of objects are displayed on the display unit 13 as illustrated in FIG. 5, for example, and the contact count for an object in the display area R1 at the lower half of the screen 13*a* has reached a predetermined value, then as in Embodiment 1, the display areas R3 and R4 in the upper half of the screen 13*a* may be treated as one display area, with the threshold setting thereof being changed to the threshold B, which is smaller than the standard threshold A.

Alternatively, the threshold setting may be changed to the threshold B for the display area R3 and to the threshold C, which is smaller than the threshold B, for the display area R4 so that the threshold becomes smaller with distance from the display area R1 at the lower half of the screen 13*a*, as in Embodiment 2.

Note that in FIG. 5, when the contact count for the display area R3 first reaches the predetermined value, the threshold for the display area R3 is left at the standard threshold A, whereas the threshold for the display areas other than the display area R3, i.e. the display area R1 and the display area R4, is set to a threshold smaller than the standard threshold A. In this case, the thresholds for the display areas R1 and R4 are, for example, set to the same threshold B. Alternatively, with increasing distance from the display area R3 at the standard threshold A, a smaller standard threshold may be set. For example, in the case of FIG. 5, the display area R1 may be set to the threshold B, and the display area R4 may be set to the threshold C, which is smaller than the threshold B.

Subsequently, similar to the above-described embodiments, when contact is detected at a position corresponding to an object displayed in any of the display areas, and data based on pressure detected by the pressure detection unit 11 satisfies the threshold corresponding to that display area, the control unit 10 executes processing associated with the object. When determining in step S305 that an operation to end the character input application has been performed, the control unit 10 returns the threshold for all of the display areas at the upper half of the screen 13*a* to the standard threshold A (step S306) and ends the character input application.

In this way, according to the present embodiment, when the contact count of the number of times an object in the same display area of the display unit 13 is contacted exceeds the predetermined value, the threshold for the display areas other than the same display area is set to a smaller value than the initial standard threshold A. As described above, the portion of the portable electronic device 1 corresponding to the display area of frequently operated objects normally tends to be gripped by the user.

Therefore, according to the present embodiment, the display area corresponding to the portion gripped by the user can be detected automatically by detecting the display area of frequently operated objects. Furthermore, the threshold for other display areas is set smaller than the standard threshold A of the display area corresponding to the gripped portion. As a result, as in the above embodiments, an input operation by pressure can be reliably detected while effectively preventing the portable electronic device 1 from being dropped at the time of an input operation. This effect is particularly noticeable when, similar to Embodiment 2, the threshold is set to be smaller as the display area is further from the display area of frequently operated objects.

Note that the present invention is not limited to the above embodiments, and a variety of modifications and changes are possible. For example, the display area of the display unit may be divided into a plurality of display areas, and the above-described threshold for the data based on pressure may be set to fixed thresholds that differ among the display areas. Furthermore, in the above embodiments, the threshold is smaller at the upper portion of the screen in the character input application, yet for example when frequently operated objects are displayed at the upper portion, the threshold may be smaller at the lower portion of the screen. According to the display state or the like of the objects displayed based on the application, the threshold for the right portion of the screen may also be smaller than for the left portion of the screen.

The display unit 13 and contact detection unit 11 in the above embodiments may be configured as an integrated device, for example by providing a common substrate with the functions of both the display unit 13 and the touch panel forming the contact detection unit 11. An example of such a device integrating the functions of both a display unit and a touch panel is a liquid crystal panel having a matrix of pixel electrodes, with a plurality of photoelectric conversion elements, such as photodiodes, regularly mixed therein. This device is contacted by a pen for a touch operation at a desired position on the panel display, and while displaying images with the liquid crystal panel structure, the device can detect the contact position by light from a backlight for liquid crystal display being reflected by the tip of the pen and received by surrounding photoelectric conversion elements.

In order for the contact detection unit 11 to detect contact, it is not essential that the pressing body physically press the contact detection unit 11. For example, if the contact detection unit 11 is an optical type, the contact detection unit 11 detects the position at which an infrared ray on the contact detection unit 11 is blocked by the pressing body, such as a finger, a stylus, or the like, and therefore the pressing body need not press the contact detection unit 11.

In the present invention, when the data based on pressure detected by the pressure detection unit satisfies a predetermined standard for detection as an operation, processing associated with the object being pressed on the display unit is executed. In this context, the data based on pressure detected by the pressure detection unit satisfying a predetermined standard for detection as an operation may refer to the data based on pressure detected by the pressure detection unit having reached a predetermined value (threshold) for recognition as an operation, to the data based on pressure detected by the pressure detection unit having exceeded a threshold for recognition as an operation, or to the pressure detection unit having detected a threshold for recognition as an operation.

REFERENCE SIGNS LIST

1: Portable electronic device
10: Control unit
11: Contact detection unit
12: Pressure detection unit
13: Display unit
13a: Screen
14: Memory unit
R1-R4: Display area

The invention claimed is:

1. A portable electronic device comprising:
a display that displays a plurality of objects;
a contact detector that detects contact at a plurality of positions corresponding to the objects displayed on the display;
a pressure detector that detects pressure due to contact on the contact detector; and
a controller that executes processing associated with an object displayed on the display when the contact detector detects contact at a position corresponding to the object and data based on the pressure detected by the pressure detector satisfies a predetermined standard, wherein
the display includes a plurality of display areas and each of the plurality of display areas is independently associated with a non-zero predetermined standard; and for each display area, the controller sets the predetermined standard, which has been associated with the display area, to an object displayed in the display area.

2. The portable electronic device according to claim 1, wherein the controller executes control so that when a contact count of a number of times the contact detector detects contact to an object in a same display area of the display satisfies a predetermined value, the predetermined standard for display areas other than the same display area is lower than the predetermined standard for the same display area.

3. The portable electronic device according to claim 2, wherein the controller executes control so that, in accordance with a distance from a display area for which the contact count satisfies the predetermined value, the predetermined standard for display areas other than the display area is incrementally lowered.

4. The portable electronic device according to claim 1, wherein the controller executes control so that the predetermined standard for a display area at an upper portion of a screen of the display is lower than the predetermined standard for other display areas.

5. The portable electronic device according to claim 4, wherein the controller executes control so that the predetermined standard is incrementally lowered from a display area at a lower portion of the screen of the display towards a display area at the upper portion of the screen.

6. The portable electronic device according to claim 1, wherein the controller executes control so that the predetermined standard differs among the display areas in accordance with an application displaying the objects on the display.

7. A portable electronic device comprising:
a display that displays a plurality of objects;
a contact detector that detects contact at a plurality of positions corresponding to the objects displayed on the display;
a pressure detector that detects pressure due to contact on the contact detector; and
a controller that executes processing associated with an object displayed on the display when the contact detector detects contact at a position corresponding to the object and data based on the pressure detected by the pressure detector satisfies a predetermined standard, wherein
the controller executes control so that the predetermined standard differs among a plurality of display areas of the display, and
the controller executes control so that when a contact count of a number of times the contact detector detects contact to an object in a same display area of the display satisfies a predetermined value, the predetermined standard for display areas other than the same display area is lower than the predetermined standard for the same display area.

* * * * *